United States Patent [19]

Yamaji et al.

[11] 4,053,989
[45] Oct. 18, 1977

[54] CO-ORDINATES MEASURING APPARATUS FOR AN EXCLUSIVE PROPELLER PROCESSING MACHINE

[75] Inventors: Hiroshi Yamaji; Kiyoshi Furukawa, both of Hiroshima, Japan

[73] Assignee: Mitsubishi Jukogyo Kabushiki Kaisha, Tokyo, Japan

[21] Appl. No.: 620,226

[22] Filed: Oct. 6, 1975

Related U.S. Application Data

[63] Continuation of Ser. No. 465,480, April 30, 1974, abandoned.

[51] Int. Cl.² .............................................. G01B 7/02
[52] U.S. Cl. .............................................. 33/174 PC
[58] Field of Search ........... 33/174 L, 174 C, 174 PC, 33/174 P

[56] References Cited

U.S. PATENT DOCUMENTS

| 1,696,525 | 12/1928 | Coolidge | 33/174 C |
| 3,164,909 | 1/1965 | Brunot et al. | 33/174 L |
| 3,795,054 | 3/1974 | Kinney | 33/174 PC |
| 3,805,393 | 4/1974 | Lemelson | 33/174 L |
| 3,840,994 | 10/1974 | Izumi et al. | 33/174 PC |

FOREIGN PATENT DOCUMENTS 1,174,117  11/1958  France .............................. 33/174 PC

OTHER PUBLICATIONS

George DeGroat, "Portable Probe Checks NC Work," Metalworking Production, July 9, 1969, pp. 39-41.
William Stocker, Jr., "Tape Controlled Inspector Measures in Six Axes," American Machinist, Feb. 9, 1959, pp. 101-103.
E. L. Watkins, "Inspecting Missile Airfoils Automatically," Control Engineering, Nov. 1956, pp. 100-106.

Primary Examiner—Richard E. Aegerter
Assistant Examiner—Richard R. Stearns
Attorney, Agent, or Firm—Toren, McGeady and Stanger

[57] ABSTRACT

In a propeller measuring device, moving means move a probe relative to the propeller to a plurality of reference positions indicative of positions on a desired propeller shape. The probe determines the deviation from reference position and a recorder records the deviation. In one embodiment, the measuring means measures only from the time the probe contacts the propeller being measured until the reference position, which is a given distance beyond the position on a desired shape, is reached.

12 Claims, 5 Drawing Figures

CO-ORDINATES MEASURING APPARATUS FOR AN EXCLUSIVE PROPELLER PROCESSING MACHINE

This is a continuation of application Ser. No. 465,480 now abandoned filed Apr. 30, 1974.

This invention relates to a co-ordinate measuring apparatus, particularly to one which measures the shape of a propeller.

Heretofore, three-dimensional measuring apparatuses have measured the distance between a predetermined origin (reference point) and the measuring point. An error value was determined by calculating it from the measured value. Thus, such apparatuses cannot be fixed to a processing machine nor measure the above-mentioned error directly without calculating the error.

An object of the invention is to provide a co-ordinates measuring apparatus for a propeller processing machine which permits a centering operation of a bossed area during processing of the propeller wing area, a verification of the cut off area by means of a co-ordinates position measurements of the wing area, or a measuring inspection of the manufacturing error at each co-ordinate position after manual finishing.

Another object of the invention is to provide a co-ordinates measuring apparatus for a propeller processing machine which is adapted to attach the measuring apparatus to the main axis head, to make a direct measurement of the wing area error automatically.

Still another object of the invention is to provide a co-ordinate measuring apparatus for a propeller processing machine which requires no time to calculate the error value from the measuring value, decreases the time of the manual operation, and increases the measuring accuracy by eliminating the errors of the measurements and the calculations.

A further object of the invention is to provide the above-mentioned co-ordinates measuring apparatus for a propeller processing machine wherein the input signal of said preset counter utilizes control pulses for the numerical control ram transmission, and the motive instructions and the timing instructions for the digital printer are adapted to act by the auxiliary (M) instructions of the numerical control.

Still another object of the invention is to provide the above-mentioned co-ordinates measuring apparatus for an exclusive propeller processing machine which is adapted to open the input gate of the preset counter at zero point of a differential transformer which cooperates with the above-mentioned detecting head.

Above objects and advantages, and the other objects and advantages of the invention will be understood more clearly with the following descriptions which explain in detail the embodiments shown in the accompanying drawings:

Here, brief explanations for the drawings will now be described.

Figure 1:
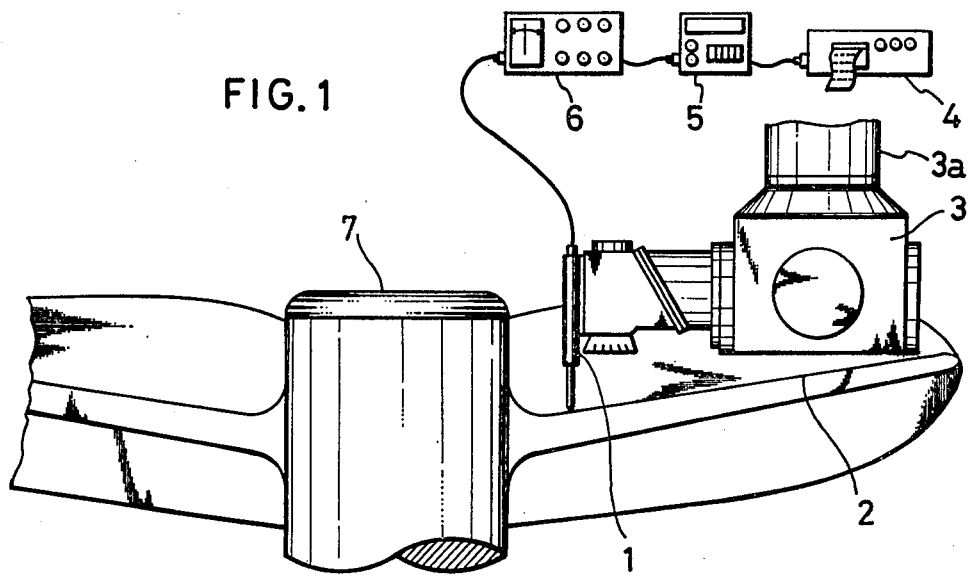
FIG. 1 is a side view which illustrates diagrammatically the construction of an embodiment of the device according to the invention.

In FIG. 1, the co-ordinate measuring apparatus according to an embodiment of the invention is composed of a detecting head 1 serving as an electric micrometer attached to a main axis head 3 which is coupled to a ram 3a of the propeller processing numerical control machine, a monitoring meter 6, a preset counter 5, and a digital printer 4. The input signal of the counter 5 utilizes control pulses for the ram, and the motion instructions and the timing instructions of the printer 4 act by the well-known auxiliary (M) instructions of the numerical control.

The control pulses for the ram correspond to the specific distances. For example, the ram 3a is moved 0.01 mm by one control pulse. Thus, it is possible to measure vertical motion of the main axis head 3 utilizing these control pulses. The control pulses for the ram motion are used as an input signal for the counter 5 for measuring movement of the main axis head 3 and detecting head 1.

Figure 3:
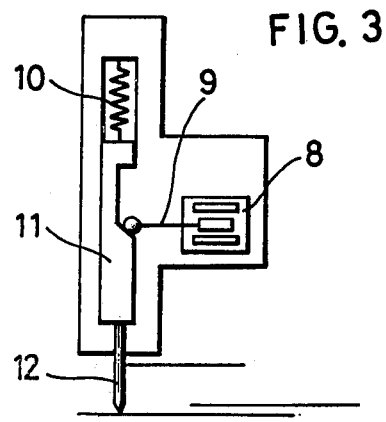
FIG. 3 is a diagram illustrating diagrammatically the construction of the detecting head according to the invention.
Figure 2:
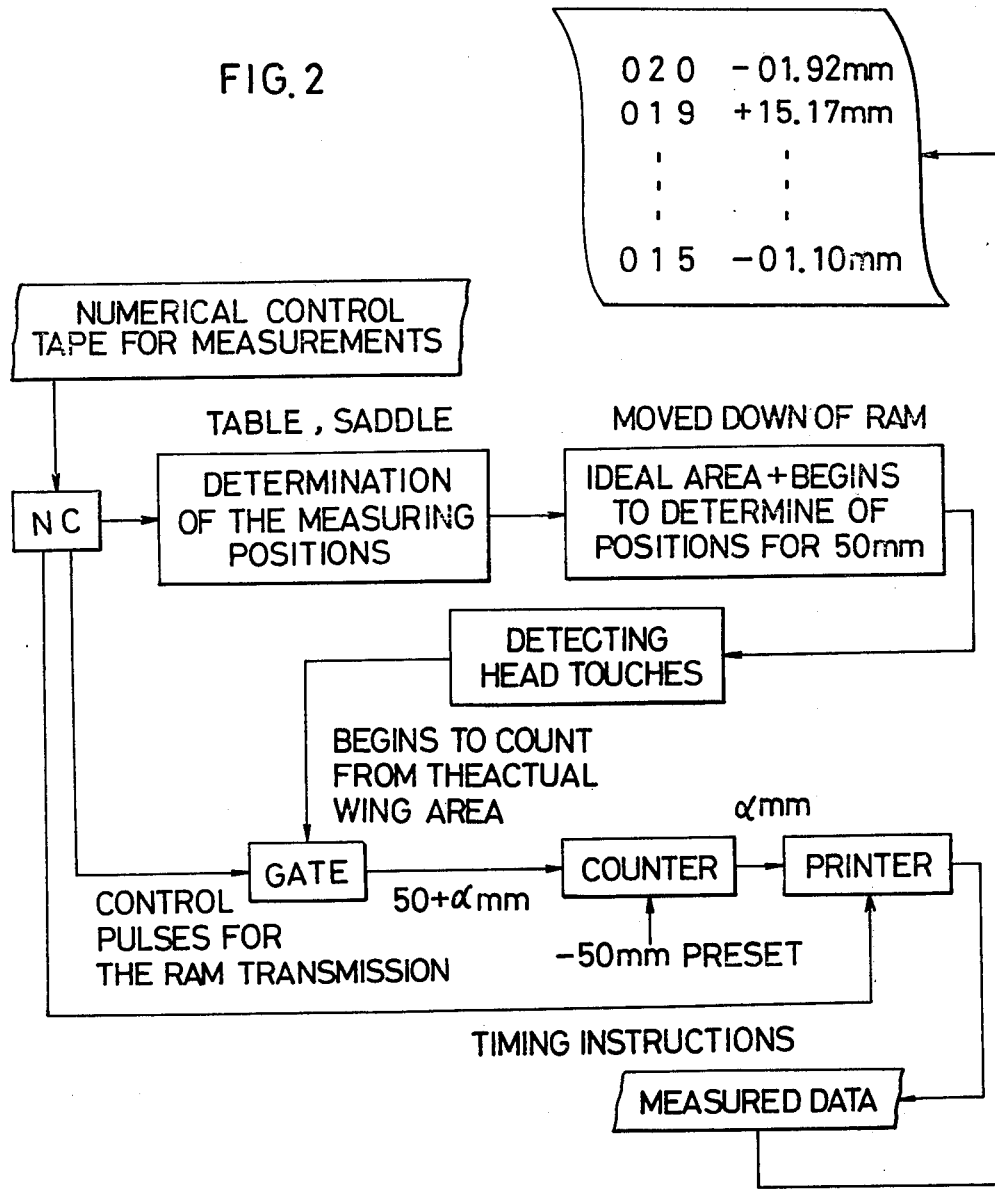
FIG. 2 is a block diagram for the explanation of the operation of the inventive device shown in FIG. 1.

The operation is shown in FIG. 2. Here the measuring position is first determined by the previously programmed numerical control tape. After this determination of the table saddle position, the ram is moved down. When the detecting head 1 attached to the main axis head 3 is in contact with the propeller wing area 2, a measuring probe 12 of the detecting head 1 shown in FIG. 3 is pressed against the wing area 2, and a cam plate 11 moves against a spring 10. On the basis of the movement of the cam plate 11, a guide bar 9 of the differential transformer 8 climbs the slope of the cam plate 11. Thereafter the guide bar 9 is independent of the effect of the stroke of the measuring probe 12. That is, the probe 12 can be displaced without varying the measuring range of the differential transformer 8.

Now, if the detecting head 1 touches the propeller wing area 2 and the guide bar 9 is depressed, the output of the differential transformer 8 passes through a zero. The input gate of the preset counter 5 is opened at this zero point of the differential transformer 8, and the counter 5 begins to count from the zero, that is, from the actual wing area P. In other words, the differential transformer 8 operates only to open the input gate of said preset counter 5.

Figure 5:
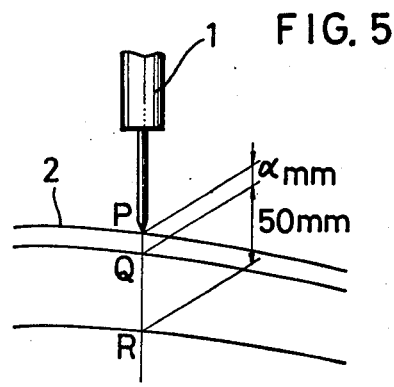
FIG. 5 is a detailed view which diagramatically illustrates details of the measuring method according to the invention.

The ram movement program sets a position R located 50 mm below the ideal curved area Q in design (see FIG. 5). Thus, it is possible to measure within the range of ±50 mm even if the actual wing area is located above the ideal wing area Q. This 50 mm means that the counter 5 indicates the difference between the ideal wing area in design Q and the actual wing area P by presetting −50 mm into the counter. If this relationship is explained according to FIG. 5, the preset value of −50 mm is subtracted from the value of counting (50 + $\alpha$) mm, that is, (50 + $\alpha$) − 50 = $\alpha$ mm. In other words, it is understood that this value $\alpha$ mm is the value of the deviation from the ideal wing area Q.

This value of the deviation $\alpha$ mm is recorded with the digital printer 4 by the timing instructions from the numerical control machine. Also, serial numbers are recorded in the order of the measurement operation in the data sheet corresponding to the measuring positions. If the value is not within the range of measurements (±50 mm), the printer 4 does not print out anything, but keeps the column blank as a space, and it continues the next measuring operation.

Figure 4:
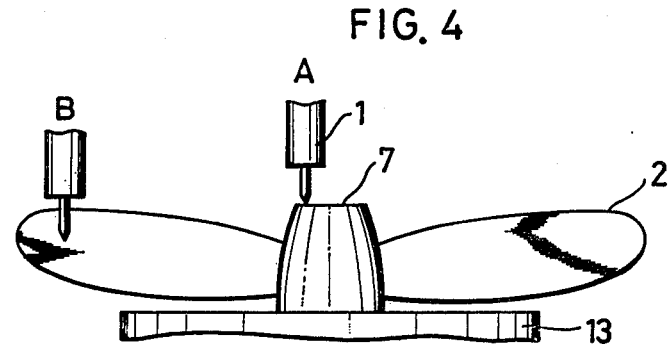
FIG. 4 is a diagram illustrating diagrammatically the measuring method according to the invention.

Moreover, as for the levelling operation for the propeller wing, it can be done pressing the detecting head 1 against the bossed area 7, turning the table 13 by manual motion, and monitoring the meter 6 in order to adjust the zero point, as shown at A point in FIG. 4.

The value of 50 mm which is preset into the preset counter 5 is variable. The range of error to be measured can be varied by changing the preset value.

If the actual wing area P coincides with the ideal wing area Q, that is, in case that the manufacturing error is zero, the detecting head 1 will move down with the ram 3a just the same as the abovementioned case, and the ram 3a will still move down for 50 mm below after the probe 12 of said head 1 gets in touch with the wing area 2. Meanwhile, when the probe 12 contracts the wing area 2, control pulses for the ram transmission are sent to the preset counter 5 which is preset at −50 mm, so the contents of the preset counter 5 will be −50+50=0 mm at the time of completion of positioning for the ram 3a. This shows that the manufacturing error is zero.

Thus, if the contents of the counter 5 is printed out upon completion of positioning for the ram 3a, the printed out value will show the manufacturing error at the measured position directly.

However, as a matter of fact, even if the program is made 50 mm below the ideal wing area, there is a mechanical delay in reference to the control pulses for the ram transmission and a delay of the contact signal for the probe 12. Thus, it is necessary to make the preset value a little lower than the value determined previously according to the above-mentioned discussions. This value to be reduced can be calibrated by measuring once the known surface, the surface whose manufacturing error is zero in general.

As will be clear from the above explanation, the deviation of the actual wing area from the ideal wing area can be measured directly, and said measurement and recording can also be done automatically by the co-ordinates measuring apparatus which attaches the measuring apparatus of the present invention into the propeller processing numerical control machine and which uses the numerical control functions of the machine at the same time.

What is claimed is:

1. A propeller measuring machine, comprising a probe moving means responsive to feed signals and coupled to the probe for moving the probe, said probe having a first portion secured to said moving means and a second portion which is held by the first portion and which projects from the first portion and which includes a tip displaceable relative to the first portion when the probe contacts a solid member with the second portion, guidance means coupled to said moving means for producing feed signals which cause said moving means to move the probe to the predetermined locations near the surface of the propeller being measured and at each location to move the moving means so that the probe travels toward contact with the surface of the propeller, detecting means coupled to said probe and said guidance means for starting the observance of feed signals from the guidance means at the time the tip is displaced in response to contact with the propeller and for continuing the observance of the feed signals until the feed signals emitted by the guide means are sufficiently great to have caused movement of the moving means toward the surface to a reference position located a predetermined distance relative to a desired propeller shape, and recording means coupled to said detecting means for recording the output of said detecting means.

2. An apparatus as in claim 1, wherein said detecting means includes a switch coupled to said probe, said switch assuming one position when said tip is not displaced and assuming a second position when said probe is displaced in response to contact with the propeller, said switch being coupled to said guidance means for passing feed signals only when said switch is in said second condition.

3. An apparatus as in claim 2, wherein said switch is a gate and said guidance means produces feed pulses, said gate passing the feed pulses only after said tip is displaced relative to said first portion.

4. An apparatus as in claim 1, wherein said probe includes signal means coupled to the main portion and the second portion for producing a predetermined signal when the tip is moved relative to the main portion, said detecting means having a switch responsive to the predetermined signal for passing feed signals only after being actuated by the predetermined signal.

5. An apparatus as in claim 4, wherein the predetermined distance is 50 mm.

6. An apparatus as in claim 5, wherein said signal means coupled to the movable member in the main portion is a differential transformer and the predetermined signal is a null signal.

7. An apparatus as in claim 1, wherein said detecting means includes a switch which passes feed signals for measuring movement of the moving means only after the probe tip is displaced in response to contact with the propeller and only until the reference position is reached.

8. The method of measuring the surface of a propeller, which comprises: moving a probe body and a probe, which projects from the body and is movable along the body, in spaced relationship to the surface of a propeller to one of a plurality of measurement positions, moving the body and the probe toward the propeller; the step of moving including moving the probe body in response to feed signals; determining when the probe moves in response to contacting the propeller, thereafter continuing to move the body toward the propeller and evaluating feed signals which control the movement of the probe body until the feed signals are sufficient to have moved the probe body to a predetermined reference location at the one of the positions to provide an indication of the position of said surface.

9. A method as in claim 8, wherein the step of moving includes moving the probe body at the measurement positions toward reference locations each of which is a given distance beyond the position on the desired propeller shape.

10. A method as in claim 9, further including the step of subtracting from the evaluated feed signals a number of feed signals corresponding to said given distance.

11. The method as in claim 8, wherein the movement of the probe in response to contact with the surface produces a predetermined indicating signal.

12. The method as in claim 11, wherein the predetermined indicating signal is a null signal which opens a gate that passes feed signals for moving of the probe body until the feed signals are sufficiently great to have moved the probe body to a predetermined reference location beyond the position on a desired propeller shape.

* * * * *